(12) United States Patent
Tatum

(10) Patent No.: US 11,652,540 B2
(45) Date of Patent: May 16, 2023

(54) LOAD BALANCING FOR A SATELLITE NETWORK

(71) Applicant: Iridium Satellite LLC, McLean, VA (US)

(72) Inventor: Patrick Tatum, Mesa, AZ (US)

(73) Assignee: IRIDIUM SATELLITE LLC, McLean, VA (US)

( * ) Notice: Subject to any disclaimer, the term of this patent is extended or adjusted under 35 U.S.C. 154(b) by 0 days.

(21) Appl. No.: 17/714,615

(22) Filed: Apr. 6, 2022

(65) Prior Publication Data

US 2022/0338059 A1 Oct. 20, 2022

Related U.S. Application Data

(63) Continuation of application No. 16/850,887, filed on Apr. 16, 2020, now Pat. No. 11,317,323, which is a continuation of application No. 16/293,941, filed on Mar. 6, 2019, now Pat. No. 10,631,206, which is a continuation of application No. 15/616,012, filed on Jun. 7, 2017, now Pat. No. 10,244,407.

(60) Provisional application No. 62/347,076, filed on Jun. 7, 2016.

(51) Int. Cl.
| | |
|---|---|
| *H04B 7/185* | (2006.01) |
| *H04W 28/08* | (2023.01) |
| *H04W 16/28* | (2009.01) |
| *H04B 15/00* | (2006.01) |
| *H04W 84/06* | (2009.01) |

(52) U.S. Cl.
CPC ........ *H04B 7/18513* (2013.01); *H04W 16/28* (2013.01); *H04W 28/08* (2013.01); *H04B 15/00* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 5,969,675 | A | 10/1999 | Erlick |
| 6,269,242 | B1 | 7/2001 | Leopold et al. |
| 9,736,794 | B1 | 8/2017 | Liu |
| 10,244,407 | B2 | 3/2019 | Tatum |
| 2013/0171983 | A1 | 7/2013 | Zhang et al. |
| 2016/0149599 | A1 | 5/2016 | Lindsay et al. |
| 2017/0099095 | A1 | 4/2017 | Wang |

*Primary Examiner* — Alex Skripnikov
(74) *Attorney, Agent, or Firm* — Baker Botts L.L.P.

(57) ABSTRACT

In one implementation, load balancing within a constellation of communications satellites is performed. Anticipated positions of satellites are determined. Each satellite is configured to provide multiple beams that define a coverage footprint for the satellite. Based on the anticipated positions of the satellites, it is determined that a first coverage footprint for a first satellite provides primary coverage of a high traffic region and portions of the first coverage footprint for the first satellite also will be covered by coverage footprints for other satellites, Based on these determinations, a beam assignments are defined in which a first subset of beams of the first satellite configured to provide coverage of a first portion of the first coverage footprint are inactive and a second subset of beams of the second satellite are active. The second subset of beams of the second satellite provide coverage within the first portion of the first coverage footprint.

20 Claims, 8 Drawing Sheets

LOAD BALANCING FOR A SATELLITE NETWORK

CROSS-REFERENCE TO RELATED APPLICATIONS

The present application is a continuation of U.S. patent application Ser. No. 16/850,887, which was filed on Apr. 16, 2020; which is a continuation of U.S. patent application Ser. No. 16/293,941, which was filed on Mar. 6, 2019, now U.S. Pat. No. 10,631,206, issued on Apr. 21, 2020; which is a continuation of U.S. patent application Ser. No. 15/616,012, which was filed on Jun. 7, 2017, now U.S. Pat. No. 10,244,407, issued on Mar. 26, 2019; which claims the benefit of U.S. Provisional Patent Application No. 62/347,076 filed on Jun. 7, 2016, the disclosures of each of which are incorporated herein by reference in their entirety.

TECHNICAL FIELD

The disclosure relates generally to satellite networks, and more specifically to load balancing for satellite networks.

SUMMARY

According to one implementation of the disclosure, load balancing within a constellation of communications satellites is performed. Anticipated positions of satellites are determined. Each satellite is configured to provide multiple beams that define a coverage footprint for the satellite. Based on the anticipated positions of the satellites, it is determined that a first coverage footprint for a first satellite provides primary coverage of a high traffic region and portions of the first coverage footprint for the first satellite also will be covered by coverage footprints for other satellites, Based on these determinations, a beam assignments are defined in which a first subset of beams of the first satellite configured to provide coverage of a first portion of the first coverage footprint are inactive and a second subset of beams of the second satellite are active. The second subset of beams of the second satellite provide coverage within the first portion of the first coverage footprint.

According to another implementation of the disclosure, congestion within a constellation of low-Earth orbit communications satellites is mitigated. Each satellite has a phased array antenna configured to provide multiple beams that collectively define a coverage footprint for the satellite with individual ones of the beams configured to provide coverage of a respective portion of the coverage footprint. It is determined that a first coverage footprint for a first satellite within the constellation of satellites provides primary coverage of a high traffic region. As a consequence of having determined that the first coverage footprint for the first satellite covers a high traffic region, a first subset of beams of the first satellite configured to provide coverage of a first portion of the first coverage footprint is inactivated. While the first subset of beams of the first satellite are inactive, a second satellite within the constellation of satellites for which a second coverage footprint overlaps with the first coverage footprint is operated with a second subset of beams configured to provide coverage within the first portion of the first coverage footprint as active.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

A constellation of low-Earth orbit ("LEO") (e.g., at an altitude between the Earth's surface and approximately 2,000 km or 1,200 miles) communications satellites may provide mobile and/or fixed communications services (e.g., voice and data communications services) across much of the Earth. In fact, in some implementations, a constellation of LEO communications satellites may be configured to provide communications services across the entire globe (or substantially the entire globe). For example, the Iridium® LEO satellite constellation provides global communications services.

In some implementations, constellations of LEO communications satellites include satellites arranged into orbital planes. For example, in one particular implementation, a constellation of LEO communications satellites includes 66 satellites arranged in 6 near-polar orbital planes of 11 satellites each such that the satellites' orbits converge over the poles and are farthest apart near the equator. In some implementations, individual satellites within constellations of LEO communications satellites may be configured to establish wireless communications cross-links (e.g., radio frequency ("RF"), optical, etc. communications cross-links) with neighboring satellites, effectively forming a mesh network in space. In other implementations, individual satellites within a constellation may not be cross-linked.

Figure 6:
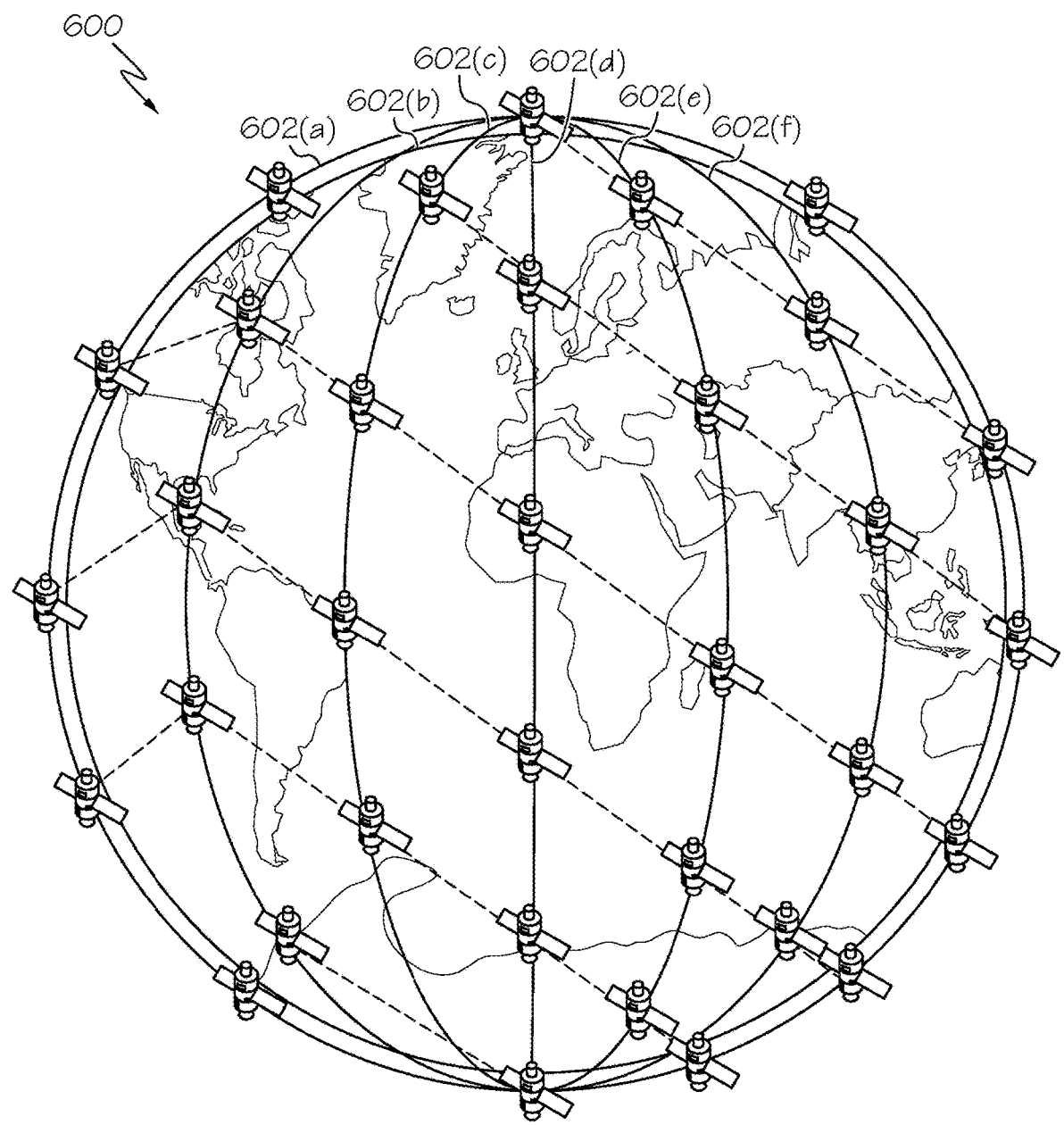
FIG. 6 is a high-level block diagram of a satellite system in accordance with a non-limiting implementation of the present disclosure.

FIG. 6 illustrates one example of a LEO constellation of cross-linked communications satellites 600. In this particular implementation, the constellation of satellites 600 is arranged in 6 near-polar orbital planes 602(a)-602(f) of 11 satellites each. As illustrated in FIG. 6, individual satellites maintain communications crosslinks with neighboring satellites in the fore, aft, east, and west directions. As further illustrated in FIG. 6, the orbital planes 602(a)-602(f) converge near the Polar Regions and are farthest apart near the equator. The constellation of satellites 600 is configured so that the coverage footprints of the individual satellites collectively cover the entire Earth. Near the equator, where the orbital planes 602(*a*)-602(*f*) are spaced relatively far apart, there may be relatively little overlap of the coverage footprints provided by individual satellites. However, as you move north and south from the equator and the orbital planes 602(*a*)-602(*f*) begin to converge, there may be progressively more overlap of the coverage footprints provided by individual satellites.

Figure 5A:
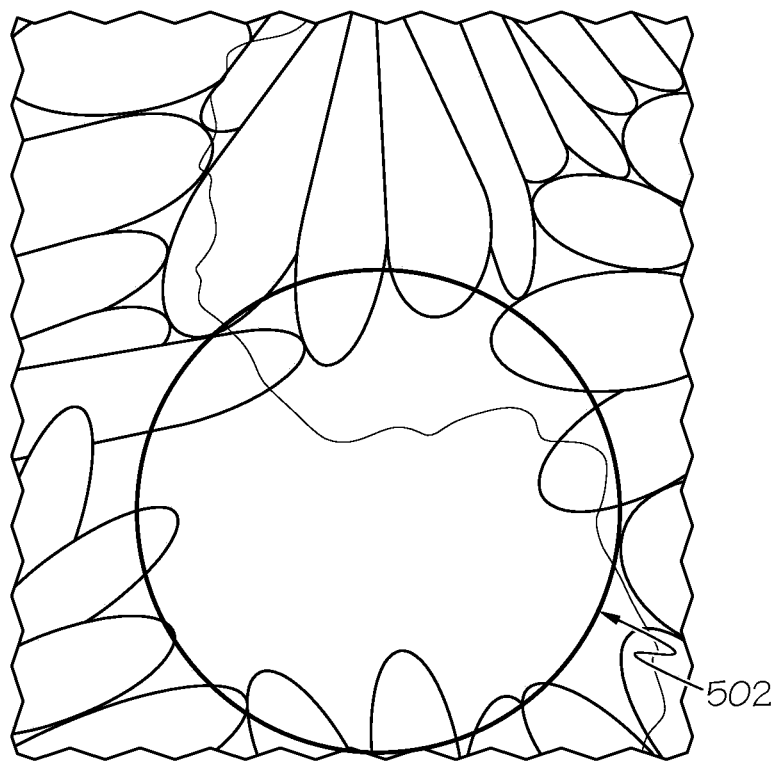
FIGS. 5A and 5B are examples of beam laydown patterns for several satellites in a satellite system in accordance with a non-limiting implementation of the present disclosure.
Figure 5B:
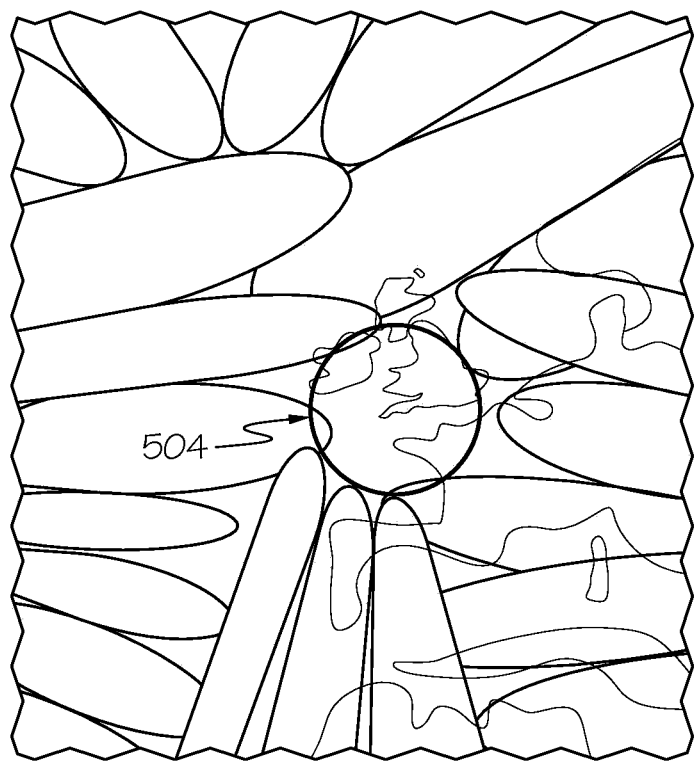

Consider the illustrations in FIGS. 5A and 5B showing examples of beam coverage provided by one example of a LEO satellite constellation in a scenario where an individual satellite is not providing any coverage. FIG. 5A illustrates the resulting coverage hole 502 near 0° latitude where individual satellites are spaced relatively far apart while FIG. 5B illustrates the resulting coverage hole 504 near 500 latitude where individual satellites are spaced more closely together. As can be understood by comparing the coverage holes 502 and 504 illustrated in FIGS. 5A and 5B, respectively, as satellites move north and/or south away from the equator, their coverage footprints increasingly overlap. Consequently, in the scenario where an individual satellite within the constellation is not providing any coverage, the resulting size of the coverage hole decreases as that satellite moves away from the equator.

In some cases, individual satellites within a LEO constellation of communications satellites may be limited as to the number of simultaneous active communication sessions they can service. For example, an individual satellite may be limited by the number of channels and/or carriers the satellite can accommodate, satellite-to-satellite cross-link bandwidth limitations, satellite processing capacity, and/or network bandwidth among other potential limitations. In fact, in certain situations, even if an individual satellite is not fully loaded in terms of the number of communications sessions it is serving with subscriber equipment at a given point, other limitations, including satellite-processing capacity, among others, may limit the number of communications sessions the satellite can service.

In certain implementations, an individual subscriber terminal may attempt to initiate a communications session or otherwise secure a communication channel by transmitting a signal or service acquisition request to a satellite, such as, for example, the satellite that is within range of the subscriber terminal from which the subscriber terminal receives the strongest signal. In response, the satellite may assign the communications session to one or more channels based on a variety of factors, including, for example, availability and service level agreements. In some cases, if the satellite has no channels available for allocation or does not have sufficient resources to service the communication session, the satellite may deny or otherwise block the acquisition request. In certain scenarios, the denial of an acquisition request may result the in issuance of a flow control event. Flow control events may be network management messages generated in response to a satellite network event, such as, for example, when a subscriber signal acquisition request is blocked due to lack of satellite resources. Flow control threshold events can be triggered in similar situations when certain resource availability thresholds within a satellite (or, for example, bandwidth limitations within an area of a satellite network) are exceeded.

In some cases, even though a LEO constellation of communications satellites may provide coverage of the entire globe or of very large regions of the globe, a small number of regions nevertheless may be responsible for a majority or a substantial amount of the overall network traffic. In such cases, network flow control events may be more likely to be triggered by satellites covering these particular heavy traffic regions than satellites covering neighboring regions where resource demand is lower. In one particular example, Central and Western Europe may represent a region where demand for satellite communications resources is quite high due to a large number of active subscribers, and the coverage footprint of a single satellite may be configured to substantially cover the entire region during a given period of time. Meanwhile, neighboring regions, such as, for example, including portions of the Atlantic Ocean and Eastern Europe and Russia to the west and east, respectively, may represent regions where resource demand is lower.

Figure 7A:
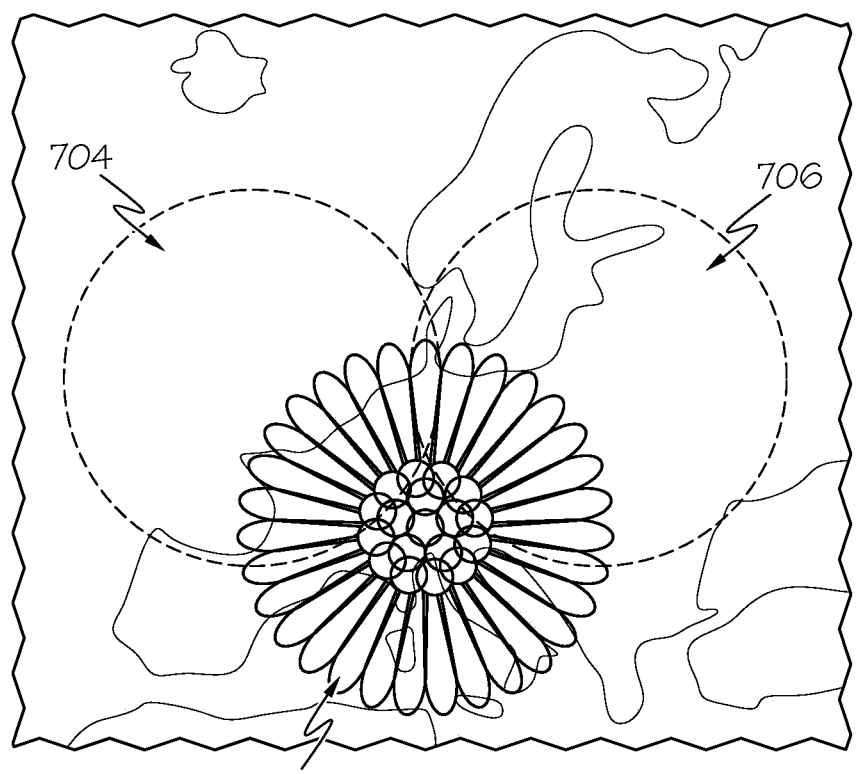
FIGS. 7A and 7B are examples of beam laydown patterns for several satellites in a satellite system in accordance with a non-limiting implementation of the present disclosure.

For example, referring to FIG. 7A, the coverage footprint 700 of a first satellite at a particular point of time may provide primary coverage for much of the high traffic region of Central and Western Europe, while the coverage footprint 704 of a second, neighboring satellite provides primary coverage for a region of the Atlantic Ocean and the coverage footprint 706 of a third, neighboring satellite provides primary coverage for a region including much of Eastern Europe and a portion of Russia. If the first satellite is used to service all of the demand in the high traffic region of central a Western Europe for which its coverage footprint 702 provides primary coverage, in some situations, the first satellite may become overloaded. Therefore, as described in greater detail below, in some implementations, neighboring satellites with coverage footprints that overlap coverage footprint 702, such as for example, coverage footprint 704 of the second satellite and coverage footprint 706 of the third satellite, may be used to service some of the load from the high traffic region of Central and Western Europe.

In some implementations, individual communications satellites have phased array antennas that provide multiple beams that collectively define the coverage footprints of their respective satellites. In one particular implementation, each individual communications satellite may have a phased array antenna configured to provide 48 beams, which collectively define the coverage footprint for the satellite. For example, referring to FIG. 7A, coverage footprint 702 is composed of 18 interior, circular beams and 30 finger-shaped beams extending outward from the interior. Furthermore, each beam may provide a number of different frequency sub-bands and/or one or more different multiplexing schemes may be employed to enable the beam to service multiple different communications channels concurrently. For example, in one particular implementation, each beam may provide 24 frequency sub-bands, each of which may be capable of servicing 10 communications sessions concurrently, such that each individual beam is capable of servicing 240 concurrent communications sessions. In some implementations, the beam pattern for an individual satellite may be fixed. Alternatively, in other implementations, individual satellites may be configured to provide steerable or otherwise configurable beams and/or beam patterns.

Under certain circumstances, the phased array antennas and/or other subsystems of the communications satellites may generate out-of-band interference. For example, communications satellites may generate a significant amount of noise and/or other spurious transmissions in adjacent, neighboring, and/or nearby frequency bands. As one particular example, some L-band communications satellites systems have been cited as causing out-of-band interference with observations being attempted by radio astronomers. In some implementations, each beam provided by the antenna of an individual satellite is powered by at least one high-power beam driver, for example, including one or more amplifiers. Such beam drivers and/or amplifiers may generate out-of-band transmissions that potentially may cause interference that may be problematic for applications in other frequency bands. Moreover, intermodulation products generated by phased array antennas driving multiple beams also pose the potential to create out-of-band interference. Such intermodulation products may stem from front-end amplifiers entering non-linear operation regions, for example, resulting in composite intermodulation products at the 3rd, 5th, 7th, and 9th harmonics of carrier signal frequencies. As the number of simultaneously active carriers is increased, the out-of-band interference effects, for example, attributable to the intermodulation products may increase dramatically.

The teachings of the present disclosure describe systems and methods for balancing loads in satellite networks and systems and methods for mitigating out-of-band interference in satellite networks. As described in greater detail below, in some specific implementations, decreasing the number of active satellite beams on certain satellite vehicles (e.g., satellites located over particular regions) may reduce or otherwise mitigate out-of-band interference, which may be particularly useful when the satellite vehicles are located over regions susceptible to out-of-band interference, such as, for example, radio astronomy observation centers. Additionally or alternatively, and as also described in greater detail below, neighboring satellites may be used to balance loads such that loads are moved away from satellites having coverage footprints that provide primary coverage of high traffic regions. In some cases, sharing loads with neighboring satellites in this manner may decrease load acquisition blocking and other service request denials, improve load servicing, decrease beam driver noise from active beams, and decrease composite intermodulation product interference from simultaneous carrier transmission on and across active beams.

Intuition suggests that, in order to provide adequate coverage of a high traffic area, as many beams as possible should be activated to service the high traffic area. However, as described herein, in certain implementations, loads are shifted from one satellite that provides primary coverage to a high traffic region to a neighboring satellite by deactivating one or more beams of the satellite that provides primary coverage to the high traffic region. Among other things, loads can refer to, for example, subscriber terminal devices such as satellite phones, satellite hotspot devices, machine-to-machine or "Internet of Things" sensors and corresponding communications devices, other data consumers such as network subscribers, or any other device capable of initiating communication sessions with a satellite network.

In certain implementations, each satellite within a LEO constellation of satellites includes a controller that manages the activation and deactivation of beams provided by the satellite's antenna system. For example, in some implementations, the controller may be configured to manage the activation and deactivation of beams by switching on and off one or more corresponding beam drivers and/or amplifiers that power individual beams. The controller can activate or de-activate particular beams responsive to instructions, such as instructions received from a terrestrial Earth station or instructions in a beam laydown table loaded into a memory of the satellite that is accessible by the controller. In some implementations, the activation of beams of each satellite is dependent upon one or more of the physical location of the satellite along its orbit (e.g., the latitude of the satellite) and/or a time. For example, a beam laydown table for a particular satellite may specify activation instructions for each beam provided by the satellite for each of multiple predefined increments of time, for instance, in four-second time intervals. Additionally or alternatively, in some implementations, beam activation can be controlled dynamically during any period of time, including on a continuous ongoing basis, such as, for example, in response to real-time updates from a terrestrial Earth station or by logic on board an individual satellite.

In particular implementations, a load balancing system may be operated in conjunction with an out-of-band interference mitigation system. For example, the techniques described in the present disclosure, in addition to mitigating out-of-band interference, also may alleviate overloading (e.g., of individual satellite capacity and/or network or communication cross-link bandwidth). In some implementations, the load balancing system can process real-time feedback from satellites regarding resource loads. In some such implementations, this information can be used to formulate a strategy for both out-of-band interference mitigation and load balancing.

In certain implementations, a particular region is targeted for out-of-band interference mitigation. For example, certain applications susceptible to out-of-band interference (e.g., radio astronomy) may be most prevalent in regions between ±350-550 latitude. In this example, each region between ±350 and 550 latitude (i.e., the region between +350 and +550 latitude and the region between −35° and −55° latitude) is considered within the target region. In particular implementations, out-of-band interference, resulting, for example, from beam driver noise and/or composite intermodulation interference effects may be mitigated by deactivating one or more beams from one or more satellites that provide coverage within or nearby the target region.

In certain implementations, a satellite that provides coverage of the target region (e.g., a satellite that provides primary coverage of the target region) receives instructions to de-activate particular beams, for example, upon determination that the satellite is responsible for covering the target region. In such implementations, terminals located in the target region that otherwise may be serviced by the de-activated beams may instead establish communications sessions via one or more beams provided by an alternative neighboring satellite that provides an overlapping coverage footprint. In particular implementations, a communications session or signal "hand-off" procedure is implemented prior to de-activating any beams. In such implementations, the hand-off procedure may involve transitioning an active communications session from one satellite to another and/or from one beam to another. In this case, the hand-off procedure transfers management and servicing of the communications session to a neighboring satellite and/or an alternative beam. The neighboring satellite and/or beam may have sufficient, or even a surplus of additional resources, available to service the transferred session.

Figure 3:
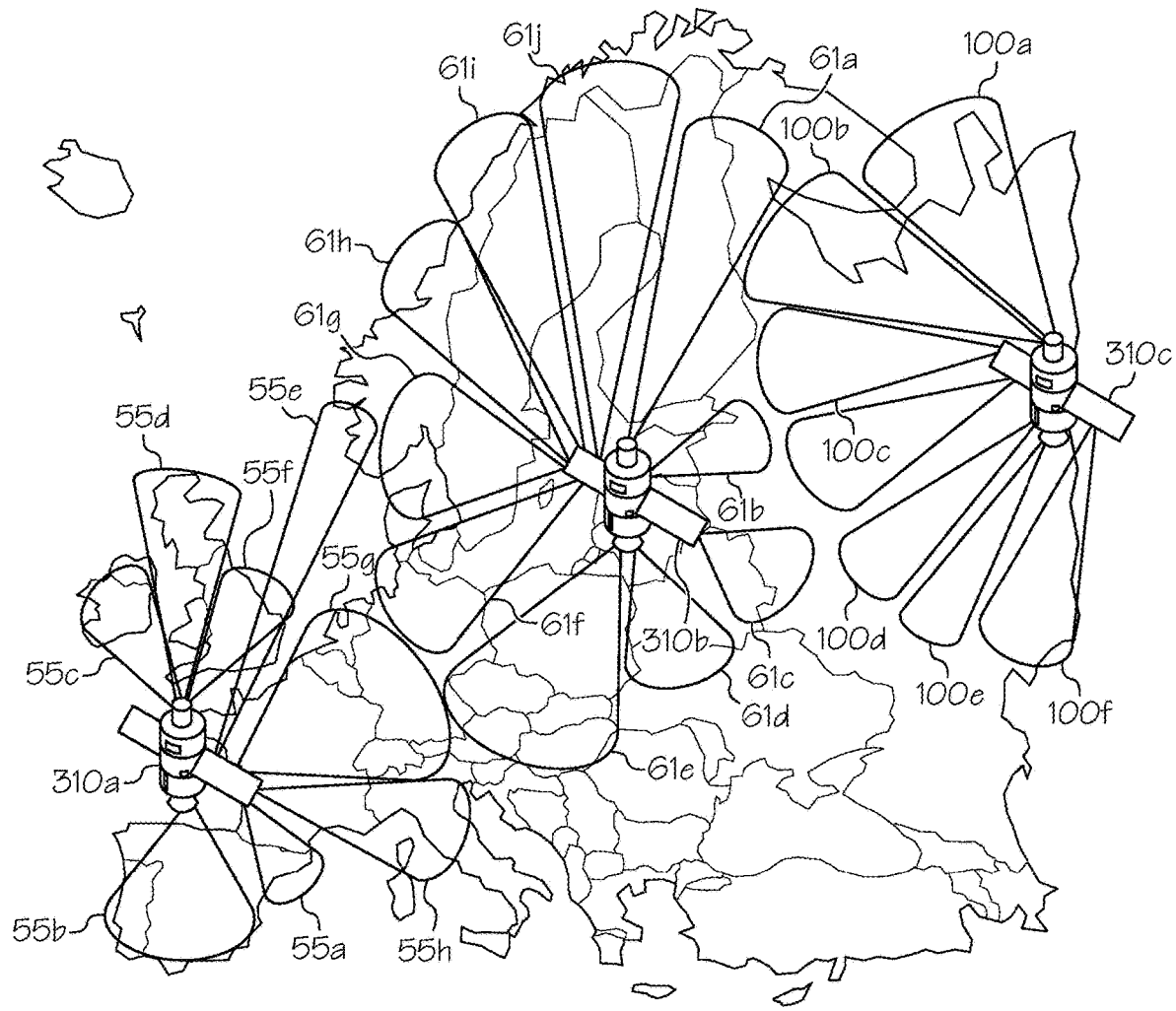
FIG. 3 is an example of beam laydown patterns for several satellites in a satellite network in accordance with a non-limiting implementation of the present disclosure.

In certain implementations, beams provided by the antenna systems of satellites may be steerable such that the beam patterns of the satellites can be changed to produce virtually any arbitrary laydown pattern. In alternative implementations, beam patterns may be fixed. Consider an example beam laydown pattern as shown in FIG. 3. In certain implementations, beams are merely activated or de-activated (i.e., turned on and/or off), and beam shape is not modified. In certain alternative implementations, beam shapes may be modified to extend beam coverage from neighboring low load satellites to high load regions to assist in transferring loads from high load satellites. For example, as illustrated in FIG. 3, satellite 310a provides beams 55a-h having configurable patterns, satellite 310b provides beams 61a-j having configurable patterns, and satellite 310c provides beams 100a-100f having configurable patterns.

Figure 4:
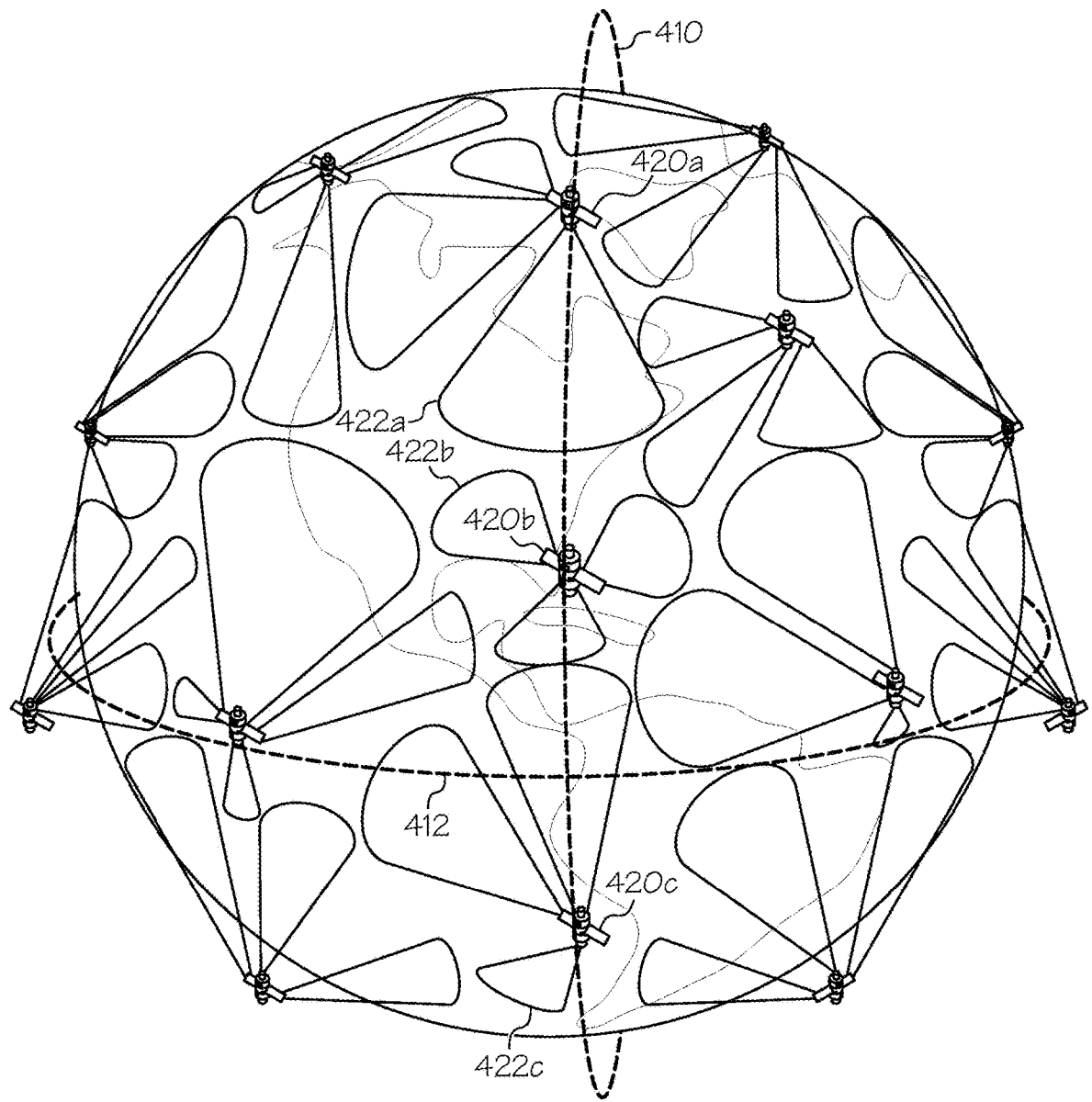
FIG. 4 is an example time-lapse illustration of a satellite system in accordance with a non-limiting implementation of the present disclosure.

Consider also the time lapsed illustration of satellite beam coverage for an example satellite 420 in low earth orbit as shown in FIG. 4. Dotted line 410 represents the satellite's 410 near-polar orbit, while dotted line 412 represents the equator. When the satellite 420 is near the equator (i.e., off the coast of South America as illustrated in FIG. 4) (represented by reference numeral 420c), all or nearly all of the satellite's beams are turned on. In fact, the large extent of the satellite's 420c coverage footprint 422c is easily seen in the illustration. By contrast, consider the same satellite's 420 coverage footprint 422b along its orbit above the East coast of North America (represented by reference numeral 420b), which, for the purposes of this example, may be considered a high load region (e.g., due to the large number of active subscriber terminals expected in the region). As illustrated in FIG. 4, the coverage footprint 422b of the satellite 420b at this stage is much smaller in extent, as one or more of the beams of the satellite 420b have been deactivated, and coverage of the area is shared with one or more beams from one or more other neighboring satellites that can "steal" loads that otherwise might be serviced by the satellite 420b. The load balancing illustrated in this particular example is accomplished by switching off active beams from the satellite 420 when positioned over regions associated with high traffic or other loading. Beams from other satellites then are used to help service portions of the high load region.

Figure 1:
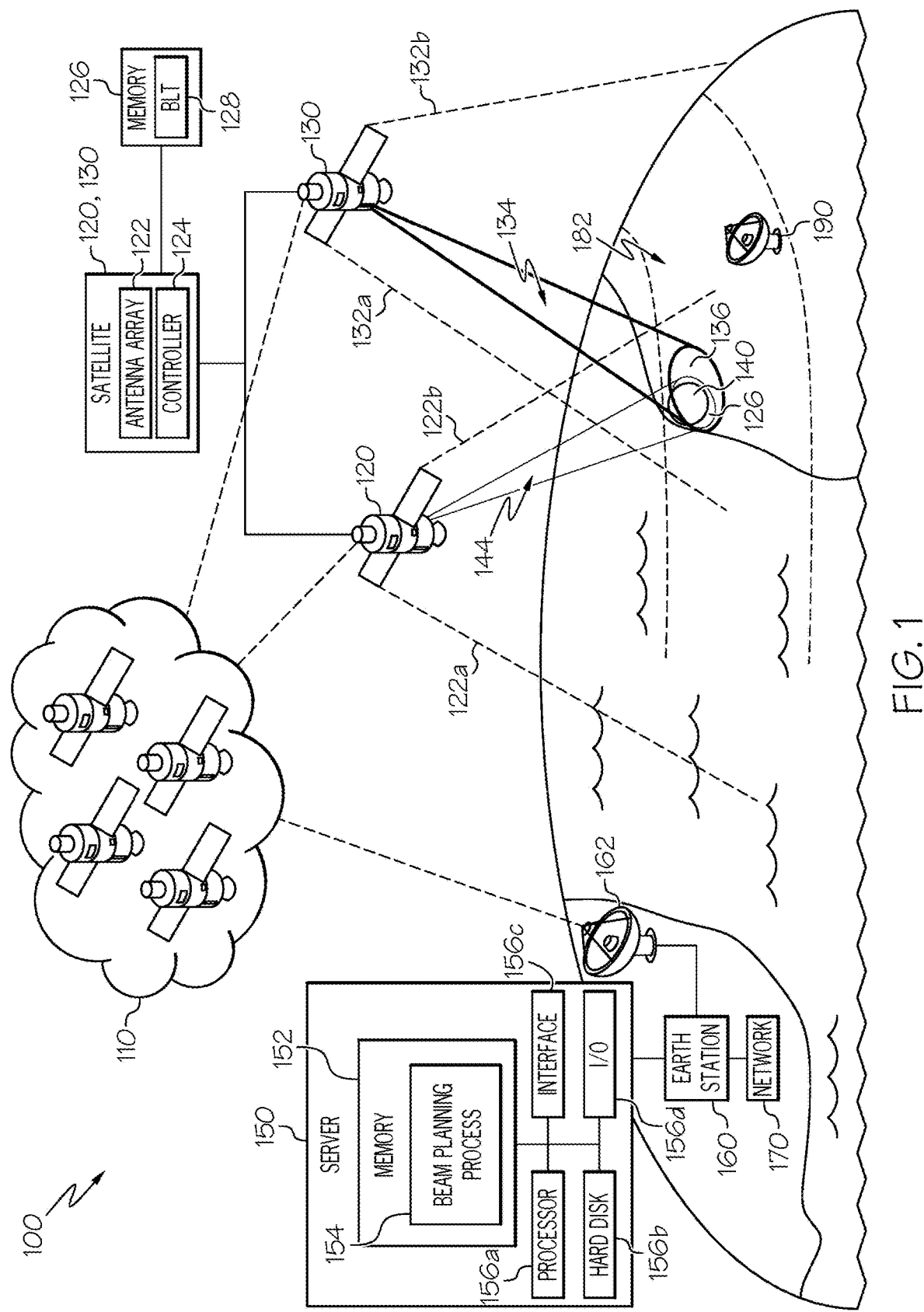
FIG. 1 is a high-level block diagram of a satellite system in accordance with a non-limiting implementation of the present disclosure.

With reference to FIG. 1, a system 100 for load balancing and/or out-of-band interference mitigation is illustrated in the context of a satellite communications network in a non-limiting implementation of the present disclosure. System 100 includes satellite network 110 (e.g., a LEO constellation of communications satellites), which also includes individual satellites 120 and 130. Each satellite includes a controller 124 configured to, among other functions, control phased array antenna 122 to control characteristics of the one or more beams provided by phased array antenna 122. Satellite network 110 transmits and receives messages to/from Earth station 160 through terminal 162, which, among other features, functions as an interface for routing communications between satellite network 110 and external network 170. Earth station 160 includes server 150 that includes memory 152, processor(s) 156a, hard disk 156b, interface 156c, and input/output device 156d. Processor(s) 156a loads instructions into memory 152 and executes instructions that have been loaded into memory 152, such as, for example, beam planning process 154.

As illustrated in FIG. 1, satellite 130 and neighboring satellite 120 provide overlapping coverage regions. Satellite 130 provides coverage by driving individual beams (e.g., beam 134) that collectively define the coverage footprint of satellite 130, for example, as illustrated in FIG. 1, between dotted lines 132a and 132b. Meanwhile, satellite 120 provides coverage by driving individual beams (e.g., beam 144) that collectively define the coverage footprint of satellite 120, for example, as illustrated in FIG. 1, between lines 122a and 122b. Beam 144 from satellite 120 and beam 134 from satellite 130 provide respective beam coverage areas 126 and 136 respectively. Beam coverage areas 126 and 136 overlap to produce overlapping coverage region 140.

In certain implementations, a subscriber terminal located in overlapping coverage region 140 may request a communications session from satellite 130. For example, a user of the terminal may initiate a telephony voice call or a data request using a satellite phone. The subscriber terminal may be configured to detect coverage provided by multiple satellites and, when coverage from multiple satellites is detected, to employ one or more methods to determine from which satellite to request a communications session. For example, in certain implementations, the terminal may determine the relative strength of each of beams 144 and 134. As illustrated in FIG. 1, since satellite 130 is located more directly over the terminal and is closer to overlapping region 140, beam 134 may be generally stronger than beam 144. Accordingly, the terminal may be configured to initiate the communications session via satellite 130. If so, satellite 130 will allocate bandwidth and other resources for use in the communications session with the terminal. For example, satellite 130 may allocate a frequency sub-band, carrier, and/or specified time slot within beam 134 for the communications session and initiate the communications session with the terminal. However, in the event that satellite 130 is overloaded (e.g., due to satellite processing capacity limitations and/or network or wireless communications cross-link bandwidth limitations) or satellite 130 otherwise is unable to allocate enough resources to service the communications session (e.g., due to other contemporaneous resource demands, such as by other terminals within service area 132), the terminal may repeat its request to initiate a communication session with satellite 130, which may be denied repeatedly due to resource constraints.

As illustrated in FIG. 1, a special interest region 182 is shown with dotted lines. Special interest region 182 may be a region that has been identified as being susceptible to out-of-band interference and/or a high traffic region. For example, other applications that potentially may be impacted negatively by out-of-band interference may be located within special interest region 182, such as, for example, radio astronomy observatory 190. Additionally or alternatively, historical and/or real time utilization data may be used to determine that special interest region 182 is a high traffic region. In some implementations, a region like special interest region 182 may be defined based on a latitude range. However, any of a variety of different characteristics could be used to define a region like special interest region 182. For example, a special interest region may be defined as a square or a circle having a specified area. As described herein, beam planning process 154 may make beam assignment determinations for an individual satellite based on whether the satellite provides coverage (e.g., primary coverage) of or within a special interest region like special interest region 182.

In certain implementations, beam planning process 154 determines position information for each satellite in network 110, for example, based on predetermined orbits for the satellites and/or based on real-time position and trajectory information. Additionally or alternatively, beam planning process 154 determines when each satellite in network 110 is positioned to provide coverage (e.g., primary coverage) of a high traffic region and/or a region susceptible to out-of-band interference. For example, beam planning process 154 may utilize satellite location information to determine when beams provided by an individual satellite may cause out-of-band interference that may negatively impact other applications, such as, for example, radio astronomy observatory 190. In such implementations, beam planning process 154 also determines beam laydown assignments (e.g., in some cases in the form of beam laydown tables or beam operating instructions) for individual satellites, for example, based on anticipated satellite position and/or whether beam planning process 154 determines the satellites are positioned to provide coverage of a high traffic region and/or a region susceptible to out-of-band interference. In some implementations, beam planning process 154 may make the above described determinations based on historical satellite network 110 data. Additionally or alternatively, beam planning process 154 may make such determinations based on real-time observations and/or predictions.

In some implementations, beam planning process 154 may determine beam assignments (e.g., active or inactive) for an individual satellite based on satellite resource utilization levels. For example, thresholds regarding resource utilization levels may direct that utilization of the satellite remain below a predetermined threshold. If the threshold is exceeded, or a threat to exceed the threshold is detected, beam planning process 154 may modify beam assignments, for example, to offload certain loads from the satellite to neighboring satellites. For example, if a first satellite is expected to be servicing a high load region during a particular period of time and is not capable of keeping its resource utilization below, for example, 80% of its maximum capacity, the first satellite may be flagged for load redistribution to neighboring satellites. If so, beam coverage areas of the first satellite may be reviewed to identify beam coverage areas expected to service regions associated with high loads. Those coverage areas then may be crosschecked against beam coverage areas from neighboring satellites to determine if one or more neighboring satellite beams overlap with and can service the regions associated with the high loads.

In particular implementations, an instruction to turn off or de-activate a beam of an individual satellite (e.g., beam 134 on satellite 130) is generated and stored in a beam assignment table. For example, beam planning process 154 may predict the position of satellite 130 with respect to region 182 during a particular period of time and generate an instruction to turn off beam 134 while satellite 130 is providing coverage of region 182. Similarly, beam planning process 154 may generate instructions to turn on or activate one or more beams on one or more neighboring satellites that, for example, provide overlapping coverage with beam 134, such as, for example, beam 144 of satellite 120. In certain implementations, two or more beams from two or more neighboring satellites may be used to cover the overlapping region. For example, when beam 134 is deactivated, satellite 130 may not provide any coverage within region 136. Consequently, additional beams from satellite 120, such as, for example, beam 144, and/or other network satellites may be used to service region 136 while beam 134 remains deactivated.

In certain implementations, beam planning process 154 generates beam assignments for individual satellites for each of multiple different intervals of time for an extended period of time into the future. For example, in some implementations, beam planning process 154 generates a beam assignment for each satellite for each 4-second interval for an extended period of time into the future (e.g., 36 hours).

Additionally or alternatively, in particular implementations, beam planning process 154 may generate a real-time or near real-time beam assignment that is transmitted to satellites 110 on a real-time or near real-time basis. For example, in such implementations, beam planning process 154 may use real-time satellite resource utilization information and/or anticipated service demand (e.g., load information) to prepare the real-time or near real-time beam assignments.

In particular implementations, beam planning process 154 transmits beam assignments (e.g., in the form of beam laydown tables, beam assignment tables, instructions, or the like) to each satellite 110 and/or receives information from (or relevant to) individual satellites 110 (e.g., like satellite resource utilization information, service demand information, and loading information) via Earth station 160 and ground terminal 162. In such implementations, after an individual satellite, such as, for example, satellite 120 or satellite 130 receives a beam assignment from beam planning process 154, the individual satellite may store the beam assignment in memory 126, such as, for example, the beam laydown table 128 stored in memory 126. Controller 124 then may access the beam assignment from memory 126 and control antenna array 122 in accordance with the beam assignment.

Figure 2A:
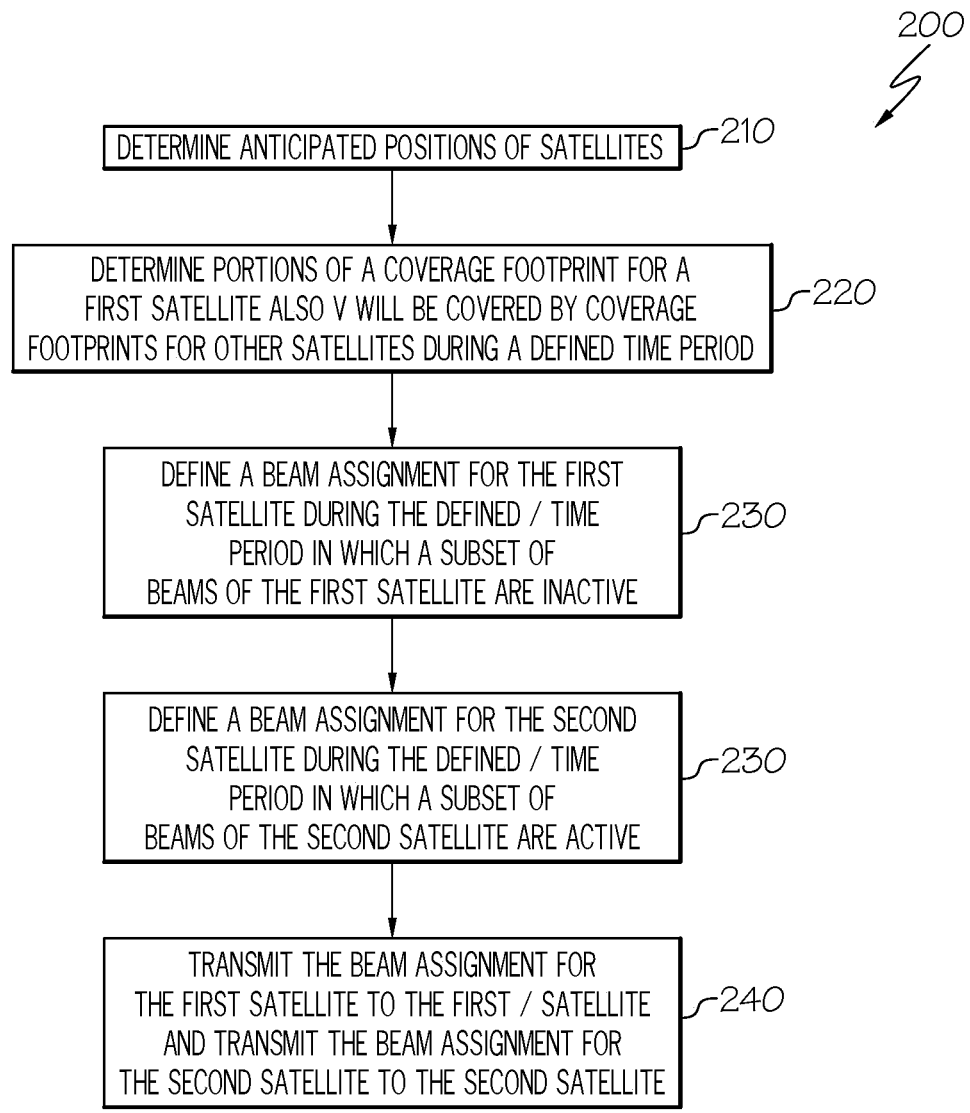
FIGS. 2A and 2B are flow charts of methods for out-of-band interference mitigation and load balancing, respectively, in satellite communication networks in accordance with non-limiting implementations of the present disclosure.

With reference to FIG. 2A, a method 200 for out-of-band interference mitigation for a satellite communications network is shown in accordance with a non-limiting implementation of the present disclosure. In some implementations, the method 200 illustrated in FIG. 2A may be performed by the processor(s) 156$a$ of FIG. 1 executing beam planning process 154 stored in memory 152.

As illustrated in FIG. 2A, at step 210, anticipated positions of individual satellites within a satellite communications network (e.g., a LEO constellation of communications satellites) are determined. In some implementations, the anticipated positions of the individual satellites may be determined based on planned orbits for the satellites. Additionally or alternatively, in some implementations, the anticipated positions of the individual satellites may be determined based on satellite ephemeris data and/or real-time or near real-time data received from one or more of the individual satellites.

At step 215, a determination is made, based on the anticipated positions of the satellites, that, during a defined period of time, portions of a coverage footprint for a first satellite also will be covered by one or more coverage footprints of other satellites of the satellite communications network. For example, as illustrated in FIG. 7A, a determination may be made that portions of the coverage footprint 702 of a first satellite also will be covered by the coverage footprints of other satellites (e.g., coverage footprints 704 and 706 of a second and third satellite, respectively) during a defined time period. In certain implementations, the coverage footprint of an individual satellite may be considered to be the footprint that would be covered (or the footprint within which a minimum service level and/or signal strength is available) if all of the beams provided by the satellite were active concurrently. In other implementations, the coverage footprint of an individual satellite may be defined according to one or more additional or alternative characteristics of the satellite's coverage. For example, with reference to FIG. 7A, the coverage footprint 702 of the first satellite may be considered to be the footprint covered when all 48 beams of the first satellite are active as illustrated for coverage footprint 702 in FIG. 7A. Alternatively, the coverage footprint 702 may be considered to be the circle that best fits the coverage footprint shape 702 when all 48 beams of the first satellite are active. In certain implementations, the individual beams of a satellite may be remain in fixed positions relative to the satellite. In such implementations, the coverage footprint for the satellite and/or the footprints covered by individual beams provided by the satellite may be determined based on the fixed positioning of the individual beams relative to the position of the satellite and the anticipated position of the satellite. In alternative implementations, individual beams may be configurable and/or steerable such that the coverage footprint of a satellite or individual beams provided by the satellite may be modified dynamically.

Figure 7B:
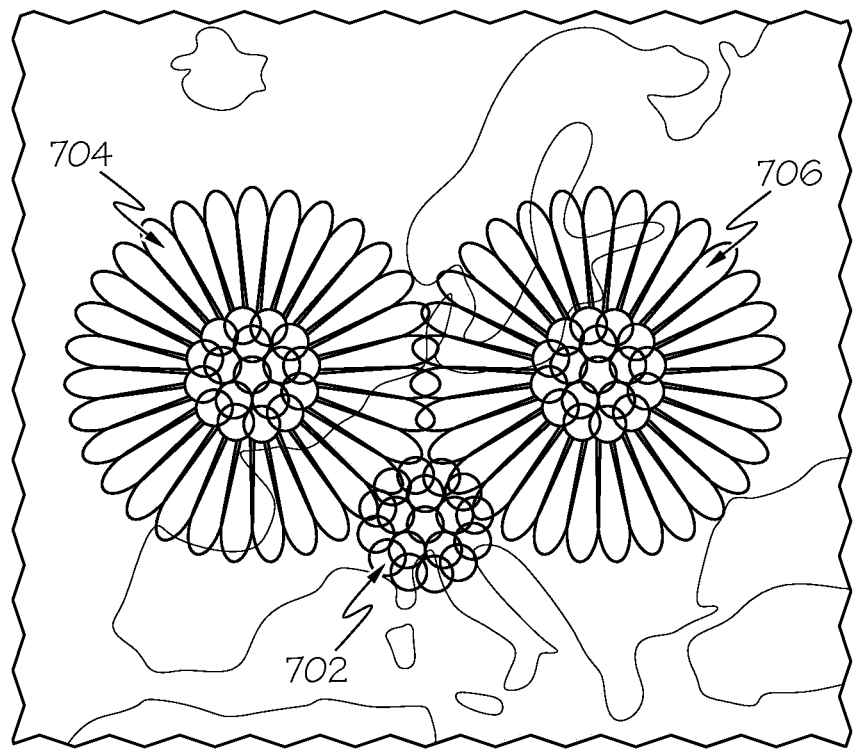

Based on having determined that portions of the coverage footprint for the first satellite also will be covered by coverage footprints for the other satellites during the defined time period, at step 220, a beam assignment for the first satellite is defined for the defined time period in which a subset of the beams of the first satellite are inactive, and, at step 225, a beam assignment for a second satellite is defined for the defined time period in which a subset of the beams of the second satellite are active. For example, referring to FIG. 7B, based on having determined that portions of the coverage footprint 702 of the first satellite also will be covered by the coverage footprints of other satellites, including, for example, the coverage footprints 704 and 706 of a second and third satellite, respectively, a beam assignment for the first satellite may be defined in which the 30 finger-shaped beams extending out from the center of coverage footprint 702 are deactivated while the 18 inner beams remain activated. Meanwhile, all 48 beams of the second satellite may be activated. In this manner, individual ones of some of the finger-shaped beams extending out from the center of coverage footprint 704 may provide coverage for a portion of the coverage footprint 702 that is not covered by the first satellite following the deactivation of the 30 finger-shaped beams extending out from the center of coverage footprint 702. Similarly, as also illustrated in FIG. 7B, all 48 beams of the third satellite also may be activated. In this manner, individual ones of some of the finger-shaped beams extending out from the center of coverage footprint 706 may provide coverage for a portion of the coverage footprint 702 that is not covered by the first satellite following the deactivation of the 30 finger-shaped beams extending out from the center of coverage footprint 702. Consequently, a subscriber terminal located within coverage footprint 702 that otherwise may be serviced by the first satellite if the 30 finger-shaped beams extending from the center of coverage footprint were not deactivated may be serviced instead by the second or third satellite. Deactivating some of the beams of the first satellite in this manner may result in reducing the out-of-band interference caused by the first satellite within coverage footprint 702.

It will be understood that FIGS. 7A and 7B are discussed in connection with the method 200 of FIG. 2A for illustration purposes only and are not intended to limit the scope of the present disclosure. For example, FIGS. 7A and 7B do not illustrate coverage being provided for all of coverage footprint 702 that is not covered by the first satellite following the deactivation of the 30 finger-shaped beams extending out from the center of coverage footprint 702. Nevertheless, in some particular implementations, beam assignments for one or more additional satellites may be defined such that beams from one or more other such satellites provide coverage for the remaining portion of the coverage footprint 702 that is not covered by the first satellite following the deactivation of the 30 finger-shaped beams extending out from the center of coverage footprint 702. Furthermore, FIG. 7B illustrates all 48 beams of the second satellite and all 48 beams of the third satellite as being activated. However, in some particular implementations, the beam assignments defined for the second and third satellites may call for one or more beams of the second satellite being deactivated and one or more beams of the third satellite being deactivated such that one or more portions of coverage footprint 704 are not covered by the second satellite and/or one or more portions of coverage footprint 706 are not covered by the third satellite.

In this manner, out-of-band interference generated by the second and/or third satellite also may be reduced. Moreover, while FIG. 7B illustrates the beam assignment for the first satellite calling for a relatively simple pattern where all 30 of the finger-shaped beams extending from the center of coverage footprint 702 being deactivated and all 18 of the inner beams of coverage footprint 702 remaining active, a beam assignment could call for any possible variation or permutation of individual beams being deactivated and activated.

In certain implementations, particularly for LEO constellations of communications satellites in near-polar orbits, beam assignments for an individual satellite in which one or more of the beams of the satellite are deactivated may be sought following a determination that the satellite is anticipated to reach a position in its orbit that exceeds a predefined latitude (e.g., ±300 or 350 latitude). In such implementations, the system may attempt to define beam assignments during a defined period of time for all satellites in the system that exceed the predefined latitude in a manner that seeks to provide full (or nearly full) coverage for the regions above the defined latitude while minimizing the total number of active beams system wide. In some systems, when a particular region is covered by two or more beams subject to deactivation, the heuristics involved in defining the beam assignments for the individual satellites may call for selecting the beam to cover the particular region that is provided by the satellite at the highest latitude. Additionally or alternatively, in certain implementations, beam assignments for an individual satellite in which one or more of the beams of the satellite are deactivated may be sought following a determination that the satellite is anticipated to reach a position in its orbit from which the satellite is expected to provide primary coverage for a region determined to be sensitive to out-of-band interference.

Additionally or alternatively, in certain implementations, the beam assignment for the first satellite may be determined based on a predicted or actual amount of out-of-band interference generated by the first satellite according to the number of beams of the first satellite activated during the defined time period. For example, in such implementations, if the predicted or actual out-of-band interference exceeds a predefined threshold value, the beam assignment for the first satellite may include instructions to shut off or de-activate particular beams of the first satellite.

In certain implementations, the beam assignments defined for the first and second satellites at steps 220 and 225 may be recorded or otherwise stored in the form of beam laydown tables for the first and second satellites.

At step 230, the beam assignments for the first and second satellites are transmitted to the first and second satellites, respectively. In some implementations, the beam assignments may be instructions that each respective satellite acts on. Furthermore, in certain implementations, beam assignments may be controlled by the transmission of the instructions from a central control unit, such as, for example, a terrestrial management system located at or in communication with an Earth station. In such implementations, a beam controller on each satellite controls the beams provided by the satellite responsive to instructions received from the Earth station. In alternative implementations, process 200 may be performed by one or more processors or other electronic logic units on board one or more of the satellites of the satellite network. In such implementations, beam assignments may be communicated to other satellites via wireless communications cross-links. Such implementations may be useful for real-time or near real-time distribution of beam assignment instructions, for example, to cut down on latency. In particular implementations, a series of beam assignments for some future time span is transmitted. In such implementations, the beam assignments may be stored in memory at each satellite and used until a new or updated set of assignments or instructions is received at some future time. In certain implementations, the beam assignments are pre-loaded before satellite launch and are updated periodically when new beam assignments are defined.

Figure 2B:
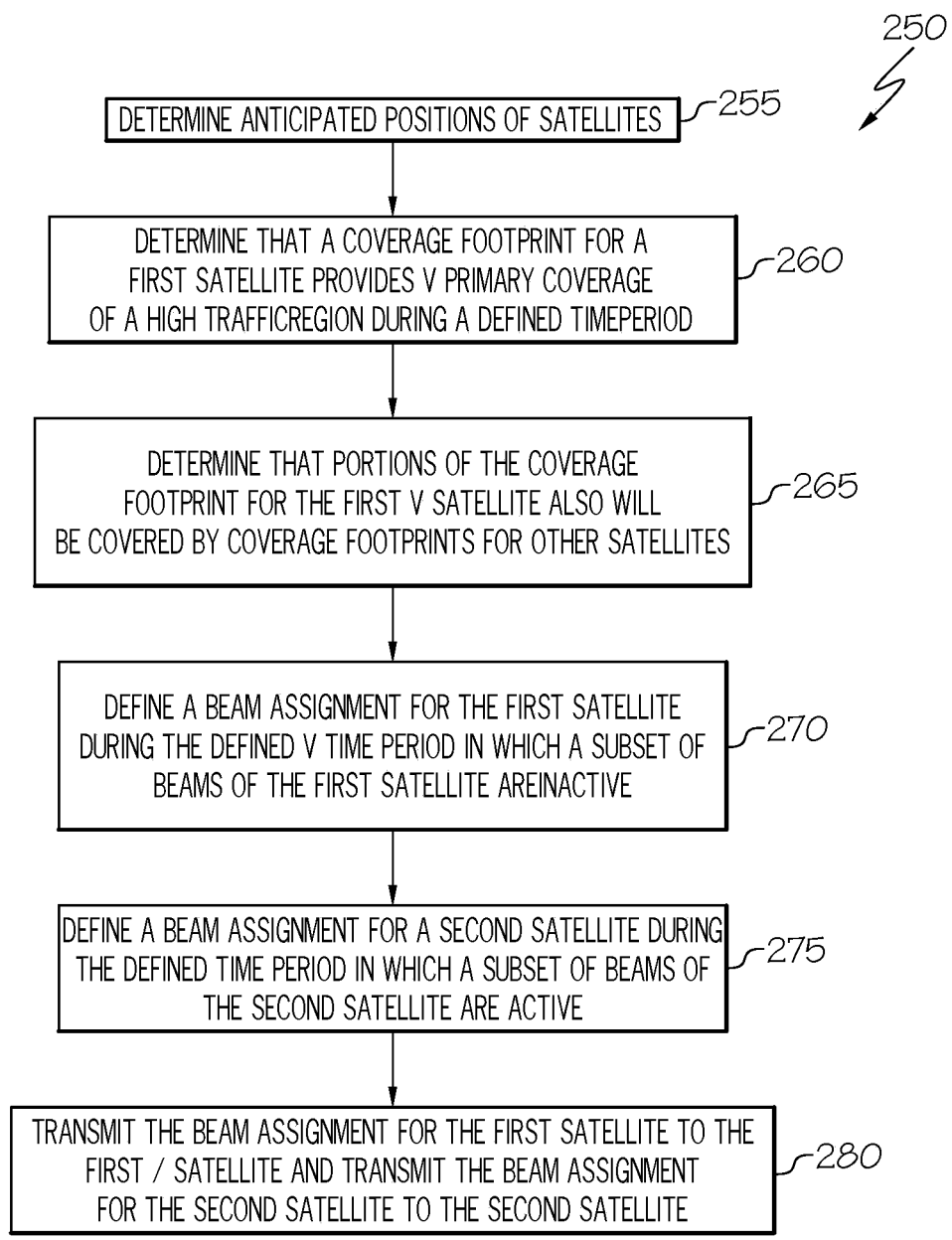

With reference to FIG. 2B, a method 250 for load balancing for a satellite communications network is shown in accordance with a non-limiting implementation of the present disclosure. In some implementations, the method 250 illustrated in FIG. 2B may be performed by the processor(s) 156a of FIG. 1 executing beam planning process 154 stored in memory 152.

As illustrated in FIG. 2B, at step 255, anticipated positions of individual satellites within a satellite communications network (e.g., a LEO constellation of communications satellites) are determined. In some implementations, the anticipated positions of the individual satellites may be determined based on planned orbits for the satellites. Additionally or alternatively, in some implementations, the anticipated positions of the individual satellites may be determined based on satellite ephemeris data and/or real-time or near real-time data received from one or more of the individual satellites.

At step 260, a determination is made, based on the anticipated positions of the satellites, that, during a defined period of time, a coverage footprint for a first satellite provides primary coverage of a high traffic region during a defined time period. With reference to FIG. 7A, for example, a determination may be made that the coverage footprint 702 for a first satellite provides primary coverage for a high traffic region in Western and Central Europe.

The determination that a satellite provides primary coverage for any particular region during a defined period of time, including, for example, a high traffic region, may be based on any of a number of different criteria. For example, in some implementations, it may be determined that a satellite provides primary coverage for a particular region during a defined period of time if, during the defined period of time, the satellite is the closest satellite among the satellites of the satellite network to the particular region. Additionally or alternatively, in some implementations, it may be determined that a satellite provides primary coverage for a particular region during a defined period of time if, during the defined period of time, the coverage footprint of the satellite covers the greatest percentage of the area of the particular region out of all of the satellites of the satellite network. Furthermore, in some implementations, it may be determined that a satellite provides primary coverage for a particular region if, on average, the beams provided by the satellite that provide coverage for the particular region during the defined time period are the highest strength and/or have the highest gain of all of the beams provided by satellites of the satellite network that provide coverage for the particular region during the defined time period. In some implementations, one or more high traffic regions may be predefined, for example, based on historical communications traffic volume through the satellite network originating from and/or terminating in the particular region. In such implementations, the predefined high traffic regions may remain defined as high traffic regions until the system is otherwise updated. Additionally or alternatively, in some implementations, one or more high traffic regions may be defined in real-time or near real-time, for example, based on current, or a recent sliding window of, communications traffic volume through the satellite network originating from and/or terminating in the particular region.

In some implementations, when the coverage footprint for an individual satellite is determined to provide primary coverage of a high traffic region, a process to reduce the number of beams provided by the satellite while the coverage footprint for the satellite provides primary coverage of the high traffic region may be triggered automatically.

At step 265, a determination is made, based on the anticipated positions of the satellites, that, during the defined period of time, portions of the coverage footprint for the first satellite (and/or the high traffic region) also will be covered by one or more coverage footprints of other satellites of the satellite communications network. For example, as illustrated in FIG. 7A, a determination may be made that portions of the coverage footprint 702 of the first satellite also will be covered by the coverage footprints of other satellites (e.g., coverage footprints 704 and 706 of a second and third satellite, respectively) during the defined time period.

Based on having determined that the coverage footprint for the first satellite provides primary coverage of the high traffic region during the defined time period and that portions of the coverage footprint for the first satellite also will be covered by coverage footprints for the other satellites during the defined time period, at step 270, a beam assignment for the first satellite is defined for the defined time period in which a subset of the beams of the first satellite are inactive, and, at step 275, a beam assignment for a second satellite is defined for the defined time period in which a subset of the beams of the second satellite are active. For example, referring to FIG. 7B, based on having determined that the coverage footprint 702 of the first satellite provides primary coverage of the high traffic region (e.g., Western and Central Europe) and that portions of the coverage footprint 702 of the first satellite also will be covered by the coverage footprints of other satellites, including, for example, the coverage footprints 704 and 706 of a second and third satellite, respectively, a beam assignment for the first satellite may be defined in which the 30 finger-shaped beams extending out from the center of coverage footprint 702 are deactivated while the 18 inner beams remain activated. Meanwhile, all 48 beams of the second satellite may be activated. In this manner, individual ones of some of the finger-shaped beams extending out from the center of coverage footprint 704 may provide coverage for a portion of the coverage footprint 702 that is not covered by the first satellite following the deactivation of the 30 finger-shaped beams extending out from the center of coverage footprint 702. Similarly, as also illustrated in FIG. 7B, all 48 beams of the third satellite also may be activated. In this manner, individual ones of some of the finger-shaped beams extending out from the center of coverage footprint 706 may provide coverage for a portion of the coverage footprint 702 that is not covered by the first satellite following the deactivation of the 30 finger-shaped beams extending out from the center of coverage footprint 702. Consequently, a subscriber terminal located within coverage footprint 702 that otherwise may be serviced by the first satellite if the 30 finger-shaped beams extending from the center of coverage footprint were not deactivated may be serviced instead by the second satellite or the third satellite. Deactivating some of the beams of the first satellite in this manner may result in reducing the load on the first satellite and/or balancing the load on the satellite network attributable to the high traffic region across multiple satellites during the defined time period instead of servicing it entirely (or primarily) with the first satellite.

It will be understood that FIGS. 7A and 7B are discussed in connection with FIG. 2B for illustration purposes only and are not intended to limit the scope of the present disclosure. For example, FIGS. 7A and 7B do not illustrate coverage being provided for all of coverage footprint 702 that is not covered by the first satellite following the deactivation of the 30 finger-shaped beams extending out from the center of coverage footprint 702. Nevertheless, in some particular implementations, beam assignments for one or more additional satellites may be defined such that beams from one or more other such satellites provide coverage for the remaining portion of the coverage footprint 702 that is not covered by the first satellite following the deactivation of the 30 finger-shaped beams extending out from the center of coverage footprint 702. Furthermore, FIG. 7B illustrates all 48 beams of the second satellite and all 48 beams of the third satellite as being activated. However, in some particular implementations, the beam assignments defined for the second and third satellites may call for one or more beams of the second satellite being deactivated and one or more beams of the third satellite being deactivated such that one or more portions of coverage footprint 704 are not covered by the second satellite and/or one or more portions of coverage footprint 706 are not covered by the third satellite. In this manner, loads within one or more regions under (or partially covered by) these coverage footprints similarly may be balanced across multiple satellites. Moreover, while FIG. 7B illustrates the beam assignment for the first satellite calling for a relatively simple pattern where all 30 of the finger-shaped beams extending from the center of coverage footprint 702 are deactivated and all 18 of the inner beams of coverage footprint 702 remain active, a beam assignment could call for any possible variation or permutation of individual beams being deactivated and activated.

In certain implementations, the beam assignments defined for the first and second satellites at steps 270 and 275 may be recorded or otherwise stored in the form of beam laydown tables for the first and second satellites.

At step 280, the beam assignments for the first and second satellites are transmitted to the first and second satellites, respectively. In some implementations, the beam assignments may be instructions that each respective satellite acts on. Furthermore, in certain implementations, beam assignments may be controlled by the transmission of the instructions from a central control unit, such as, for example, a terrestrial management system located at or in communication with an Earth station. In such implementations, a beam controller on each satellite controls the beams provided by the satellite responsive to instructions received from the Earth station. In alternative implementations, process 250 may be performed by one or more processors or other electronic logic units on board one or more of the satellites of the satellite network. In such implementations, beam assignments may be communicated to other satellites via wireless communications cross-links. Such implementations may be useful for real-time or near real-time distribution of beam assignment instructions, for example, to cut down on latency. In particular implementations, a series of beam assignments for some future time span is transmitted. In such implementations, the beam assignments may be stored in memory at each satellite and used until a new or updated set of assignments or instructions is received at some future time. In certain implementations, the beam assignments are pre-loaded before satellite launch and are updated periodically when new beam assignments are defined.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the out-of-band interference mitigation techniques and the load balancing techniques disclosed herein are described frequently in the context of LEO constellations of communications satellites in near-polar orbits, the out-of-band interference mitigation techniques and the load balancing techniques disclosed herein may be employed in any of a number of a variety of other satellite network configurations, including, for example, in orbits other than near-polar orbits and/or low-Earth orbit including medium-Earth orbit ("MEO") and geostationary orbit ("GEO").

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method of operating a satellite communications system, the method comprising:
   assessing, using one or more processors, the expected orbits of two or more satellites of the satellite communications system during a period of time;
   identifying, using the one or more processors and based on having assessed the expected orbits of the two or more satellites of the satellite communications system:
      a first area to which a first one of the satellites is expected to provide communications services during the period of time, and
      a second area to which a second one of the satellites is expected to provide communications services during the period of time;
   determining, using the one or more processors, that demand for communications services from the satellite communications system is expected to be high within the first area during the period of time;
   determining, using the one or more processors, that the second area includes at least a portion of the first area; and
   based on having determined that the demand for communications services is expected to be high within the first area during the period of time and having determined that the second area includes at least a portion of the first area:
      controlling, using the one or more processors, the first satellite to limit the communications services provided by the first satellite during the period of time, and
      controlling, using the one or more processors, the second satellite to provide communications services during the period of time in the portion of the first area included within the second area.

2. The method of claim 1, wherein assessing the expected orbits of two or more satellites of the satellite communications system during the period of time includes assessing the expected orbits of the two or more satellites during the period of time based on planned orbits for the two or more satellites during the period of time.

3. The method of claim 1, wherein assessing the expected orbits of two or more satellites of the satellite communications system during the period of time includes assessing the expected orbits of the two or more satellites during the period of time based on ephemeris data for the two or more satellites.

4. The method of claim 1, wherein assessing the expected orbits of two or more satellites of the satellite communications system during the period of time includes assessing the expected orbits of the two or more satellites during the time period based on self-reported current location information received from each of the two or more satellites.

5. A system for operating a satellite communications system, the system comprising:
   one or more processing elements; and
   a memory coupled to the one or more processing elements storing instructions that, when executed by one or more processing elements, cause the one or more processing elements to:
      assess the expected orbits of two or more satellites of the satellite communications system during a period of time;
      identify, based on having assessed the expected orbits of the two or more satellites of the satellite communications system:
         a first area to which a first one of the satellites is expected to provide communications services during the period of time, and
         a second area to which a second one of the satellites is expected to provide communications services during the period of time;
      determine that demand for communications services from the satellite communications system is expected to be high within the first area during the period of time;
      determine that the second area includes at least a portion of the first area; and
      as a consequence of having determined that the demand for communications services is expected to be high within the first area during the period of time and having determined that the second area includes at least a portion of the first area:
         control the first satellite to limit the communications services provided by the first satellite during the period of time, and
         control the second satellite to provide communications services during the period of time in the portion of the first area included within the second area.

6. The system of claim 5, wherein the instructions that, when executed by one or more processing elements, cause the one or more processing elements to assess the expected orbits of two or more satellites of the satellite communications system during the period of time include instructions that, when executed by one or more processing elements, cause the one or more processing elements to assess the expected orbits of the two or more satellites during the period of time based on planned orbits for the two or more satellites during the period of time.

7. The system of claim 5, wherein the instructions that, when executed by one or more processing elements, cause the one or more processing elements to assess the expected orbits of two or more satellites of the satellite communications system during the period of time include instructions that, when executed by one or more processing elements, cause the one or more processing elements to assess the expected orbits of the two or more satellites during the period of time based on ephemeris data for the two or more satellites.

8. The system of claim 5, wherein the instructions that, when executed by one or more processing elements, cause the one or more processing elements to assess the expected orbits of two or more satellites of the satellite communications system during the period of time include instructions that, when executed by one or more processing elements, cause the one or more processing elements to assess the expected orbits of the two or more satellites during the period of time based on self-reported current location information received from each of the two or more satellites.

9. The system of claim 5, wherein the instructions that, when executed by one or more processing elements, cause the one or more processing elements to determine that demand for communications services from the satellite communications system is expected to be high within the first area during the period of time include instructions that, when executed by one or more processing elements, cause the one or more processing elements to determine that demand for communications services from the satellite communications system is expected to be high within the first area during the period of time based on a measure of current utilization of the satellite communications system within the first area.

10. The system of claim 5, wherein the instructions that, when executed by one or more processing elements, cause the one or more processing elements to determine that demand for communications services from the satellite communications system is expected to be high within the first area during the period of time include instructions that, when executed by one or more processing elements, cause the one or more processing elements to determine that demand for communications services from the satellite communications system is expected to be high within the first area during the period of time based on data reflecting historical demand for communications services from the satellite communications system within the first area.

11. The system of claim 5, wherein:
the first satellite includes an antenna that is configured to provide multiple beams for providing communications service; and
the instructions, that, when executed by one or more processing elements, cause the one or more processing elements to control the first satellite to limit the communications services provided by the first satellite during the period of time include instructions that, when executed by one or more processing elements, cause the one or more processing elements to control the first satellite to deactivate one or more beams of the antenna of the first satellite for at least a portion of the period of time.

12. The system of claim 5, wherein:
the second satellite includes an antenna that is configured to provide multiple beams for providing communications service; and
the instructions that, when executed by one or more processing elements, cause the one or more processing elements to control the second satellite to provide communications services during the period of time in the portion of the first area included within the second area include instructions that, when executed by one or more processing elements, cause the one or more processing elements to control the second satellite to modify a pattern of the beams of the antenna for the second satellite.

13. A non-transitory, computer-readable storage medium storing instructions for operating a satellite communications system that, when executed by a computing system, cause the computing system to:
assess the expected orbits of two or more satellites of the satellite communications system during a period of time;
identify, based on having assessed the expected orbits of the two or more satellites of the satellite communications system:
a first area to which a first one of the satellites is expected to provide communications services during the period of time, and
a second area to which a second one of the satellites is expected to provide communications services during the period of time;
determine that demand for communications services from the satellite communications system is expected to be high within the first area during the period of time;
determine that the second area includes at least a portion of the first area; and
as a consequence of having determined that the demand for communications services is expected to be high within the first area during the period of time and having determined that the second area includes at least a portion of the first area:
control the first satellite to limit the communications services provided by the first satellite during the period of time, and
control the second satellite to provide communications services during the period of time in the portion of the first area included within the second area.

14. The computer-readable storage medium of claim 13, wherein the instructions that, when executed by a computing system, cause the computing system to assess the expected orbits of two or more satellites of the satellite communications system during the period of time include instructions that, when executed by a computing system, cause the computing system to assess the expected orbits of the two or more satellites during the period of time based on planned orbits for the two or more satellites during the period of time.

15. The computer-readable storage medium of claim 13, wherein the instructions that, when executed by a computing system, cause the computing system to assess the expected orbits of two or more satellites of the satellite communications system during the period of time include instructions that, when executed by a computing system, cause the computing system to assess the expected orbits of the two or more satellites during the period of time based on ephemeris data for the two or more satellites.

16. The computer-readable storage medium of claim 13, wherein the instructions that, when executed by a computing system, cause the computing system to assess the expected orbits of two or more satellites of the satellite communications system during the period of time include instructions that, when executed by a computing system, cause the computing system to assess the expected orbits of the two or more satellites during the period of time based on self-reported current location information received from each of the two or more satellites.

17. The computer-readable storage medium of claim 13, wherein the instructions that, when executed by a computing system, cause the computing system to determine that demand for communications services from the satellite communications system is expected to be high within the first area during the period of time include instructions that, when executed by a computing system, cause the computing system to determine that demand for communications services from the satellite communications system is expected to be high within the first area during the period of time based on a measure of current utilization of the satellite communications system within the first area.

18. The computer-readable storage medium of claim 13, wherein the instructions that, when executed by a computing system, cause the computing system to determine that demand for communications services from the satellite communications system is expected to be high within the first area during the period of time include instructions that, when executed by a computing system, cause the computing system to determine that demand for communications services from the satellite communications system is expected to be high within the first area during the period of time based on data reflecting historical demand for communications services from the satellite communications system within the first area.

19. The computer-readable storage medium of claim 13, wherein:
the first satellite includes an antenna that is configured to provide multiple beams for providing communications service; and
the instructions, that, when executed by a computing system, cause the computing system to control the first satellite to limit the communications services provided by the first satellite during the period of time include instructions that, when executed by a computing system, cause the computing system to control the first satellite to deactivate one or more beams of the antenna of the first satellite for at least a portion of the period of time.

20. The computer-readable storage medium of claim 13, wherein:
the second satellite includes an antenna that is configured to provide multiple beams for providing communications service; and
the instructions that, when executed by a computing system, cause the computing system to control the second satellite to provide communications services during the period of time in the portion of the first area included within the second area include instructions that, when executed by a computing system, cause the computing system to control the second satellite to modify a pattern of the beams of the antenna for the second satellite.

* * * * *